Jan. 31, 1928. W. O. VIVARTTAS Re. 16,861

BEARING SUPPORT FOR MACHINE TOOLS

Original Filed May 15, 1925 2 Sheets-Sheet 1

Inventor:
William O. Vivarttas,
By Clindahl, Parker & Barlow
Attys

Jan. 31, 1928. W. O. VIVARTTAS Re. 16,861
BEARING SUPPORT FOR MACHINE TOOLS
Original Filed May 15, 1925 2 Sheets-Sheet 2
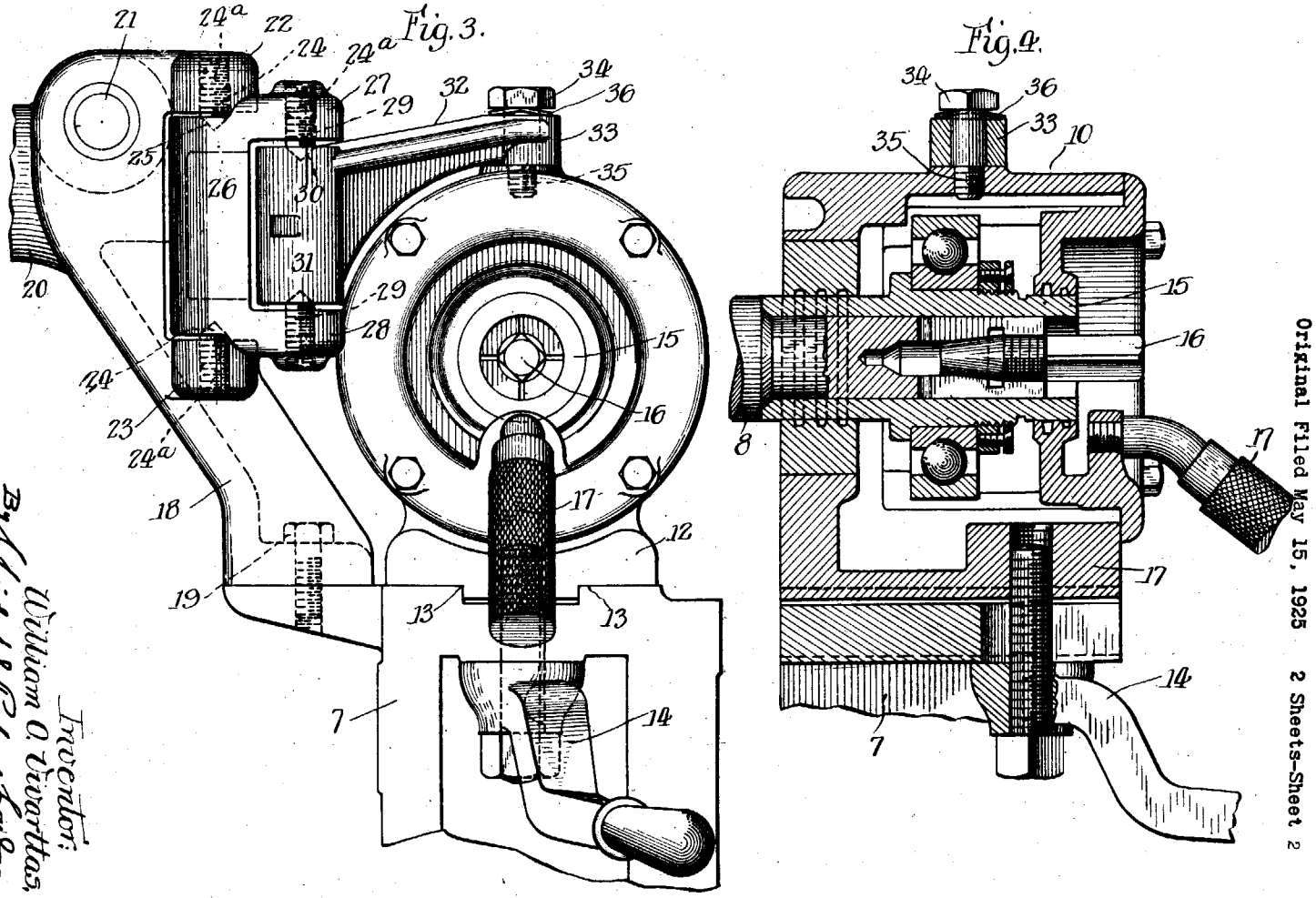
Inventor:
William O. Vivarttas,
By Chindahl, Parker & Carlson
Attys.

Reissued Jan. 31, 1928. Re. 16,864

UNITED STATES PATENT OFFICE.

WILLIAM O. VIVARTTAS, OF ROCKFORD, ILLINOIS, ASSIGNOR TO MATTISON MACHINE WORKS, OF ROCKFORD, ILLINOIS, A CORPORATION OF ILLINOIS.

BEARING SUPPORT FOR MACHINE TOOLS.

Original No. 1,599,600, dated September 14, 1926, Serial No. 30,414, filed May 15, 1925. Application for reissue filed February 18, 1927. Serial No. 169,398.

The invention pertains to machine tools, and more particularly to wood working machines such as moulders, planers, matchers, turning machines, and the like. In such machines certain of the cutters are mounted on spindles journalled at opposite ends in bearings mounted on the machine frame. In order to permit of the removal and replacement of the cutters, the bearing for one end of each spindle is detachably secured to the frame so as to be removable at will. Normally such detachable bearings rest upon ways provided on the machine frame, upon which ways the bearing is slid axially relative to the spindle in the operation of removing it from or replacing it upon the machine.

Heretofore, when the operator desired to remove the cutter head on a spindle, he would, after unlocking or releasing the clamping means holding the detachable bearing in normal position, remove the bearing from its support on the frame so as to disengage it from the spindle, and place it in some convenient place, usually on the floor of the work room or shop some distance away from the machine. Now these bearings are made of substantial size and weight from fifty to seventy-five pounds. Considerable labor is, therefore, involved in removing the bearing and replacing it upon the machine, and also the operation is a time-consuming one. Moreover, the floor and other supporting surfaces are usually covered with shavings and other refuse which have a tendency to cling to the underside of the bearing while the same is being replaced upon the machine; and frequently such refuse is carried to the machine frame and becomes lodged between the bearing and its supporting ways. The presence of such refuse, while not apparent to the operator when he secures the head in place, nevertheless is sufficient to hold the bearing out of alinement, with the result that the spindle does not run true, causing a chattering of the cutter head against the work and consequently injuring or entirely spoiling the work.

The object of my invention is to provide a means for effectually supporting a detachable bearing for cutter spindles whereby the bearing may be moved from a normal operative position on the machine frame to an inoperative position away from the spindle, and vice versa, with a minimum expenditure of time and effort on the part of the operator, while eliminating danger of the entrance of foreign matter between the bearing and its normal support when replaced thereon; to the end that the difficulties above set forth may be effectually overcome.

In the accompanying drawings I have shown a preferred construction of a supporting means embodying my invention, but it is contemplated that various changes in the construction and arrangement as herein set forth may be made by those skilled in the art without departing from the spirit and scope of the invention as expressed in the appended claims.

Figure 1 of the drawings is a fragmentary plan view partially diagrammatic in character, showing a horizontal cutter head spindle with its removable bearing and the means which I have provided for movably supporting the bearing.

Fig. 3 is a fragmentary end view of the bearing in normal position.

Fig. 4 is a fragmentary vertical sectional view showing more particularly the construction of the bearing and the manner of securing it in normal operative position with respect to the frame and the cutter spindle.

Figure 1:
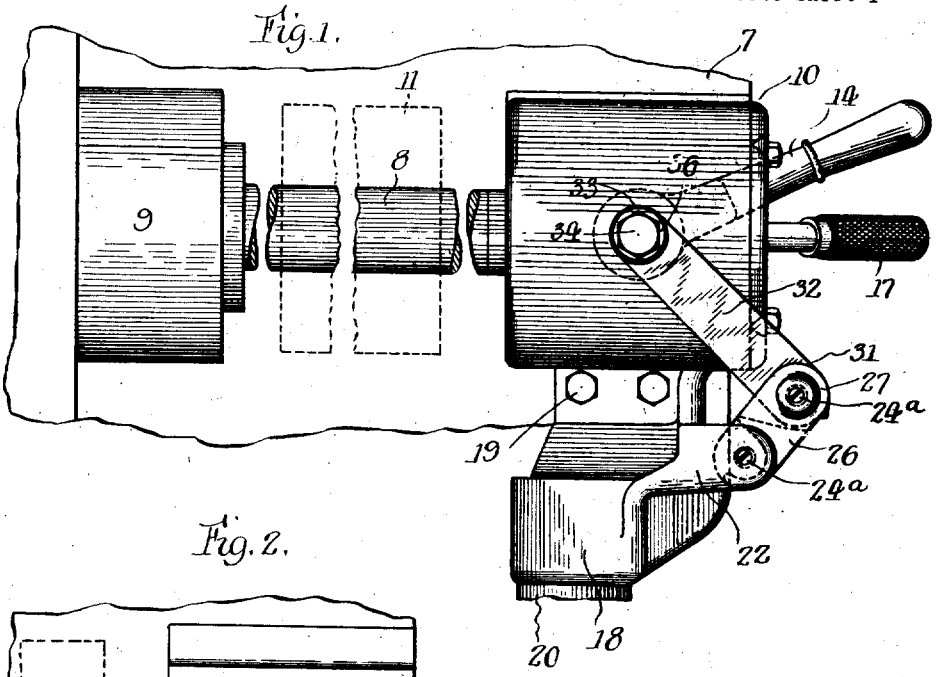

The frame of a machine, which is herein shown as a moulding machine, is generally designated by the numeral 7, and 8 indicates one of the horizontal cutter head spindles journalled at one end in a stationary bearing 9 and at its other in a detachable bearing 10. 11 indicates diagrammatically the cutter head.

The bearing 10 has upon its lower side a base portion 12 arranged to slide upon ways 13 formed upon the upper side of the frame 7 and extending transversely of the frame or parallel to the axis of the spindle 8. Normally the bearing is clamped in position upon the ways 13 by a clamping means generally designated by the numeral 14, and the end of the spindle is clamped to a bearing sleeve 15 rotatable within the bearing proper by means of an expanding clamping device 16 of suitable construction. 17 is a handle secured to the bearing and projecting from its outer end whereby when the clamping devices 14 and 16 release the bearing from the spindle and the frame, the bearing may be withdrawn out of operative association therewith.

The means which I have provided for supporting the bearing 10 is such as to be capable of permitting the bearing to move first axially out of engagement with the frame and spindle and thence to an out of the way position at one side of the spindle, such as will permit of the removal of the cutter head 11. This means is herein shown in the form of a swinging carrier whereby the bearing may swing on a vertical axis, and hence the direction of movement thereof is laterally or in a horizontal path away from the axis of the spindle.

The construction employed is relatively simple, comprising an upstanding arm or bracket 18 having its lower end secured as by means of bolts 19 to the frame of the machine at one side of the bearing when in its normal position. This bracket arm forms in the present embodiment a part of the means for pivotally supporting a chip breaker arm 20 which is pivoted to the upper end of the bracket at 21. Formed on the upper end of the bracket 18, at its outer side, is a pair of vertically spaced lugs 22 and 23 provided with screw-threaded pivot centers 24 engaging in sockets 25 in the upper and lower sides of a short arm or link 26, near one end thereof. Additional screws 24ª serve to lock the pivot centers in position.

The opposite end of said link is bifurcated to form lugs 27 and 28 with pivot centers 29 similar to the lugs 22 and 23 and the centers 24, the centers 29 being locked in adjusted position by screws 24ª. The centers 29 enter sockets 30 in the upper and lower sides of an enlargement or head 31 of a longer link or arm 32. Said arm 32 is shaped upon its under side to conform to the curved periphery of the bearing, and its free end has an apertured bearing 33 through which is entered a pivot bolt 34 screw-threaded at its lower end into the upper side of the bearing as indicated at 35. A spring washer 36 is interposed between the head of the bolt and the upper side of the bearing 33 for the purpose of slightly raising the bearing from its seat, thus eliminating friction between the bearing and its seat when either removing the bearing from or replacing it in its operative position.

Figure 2:
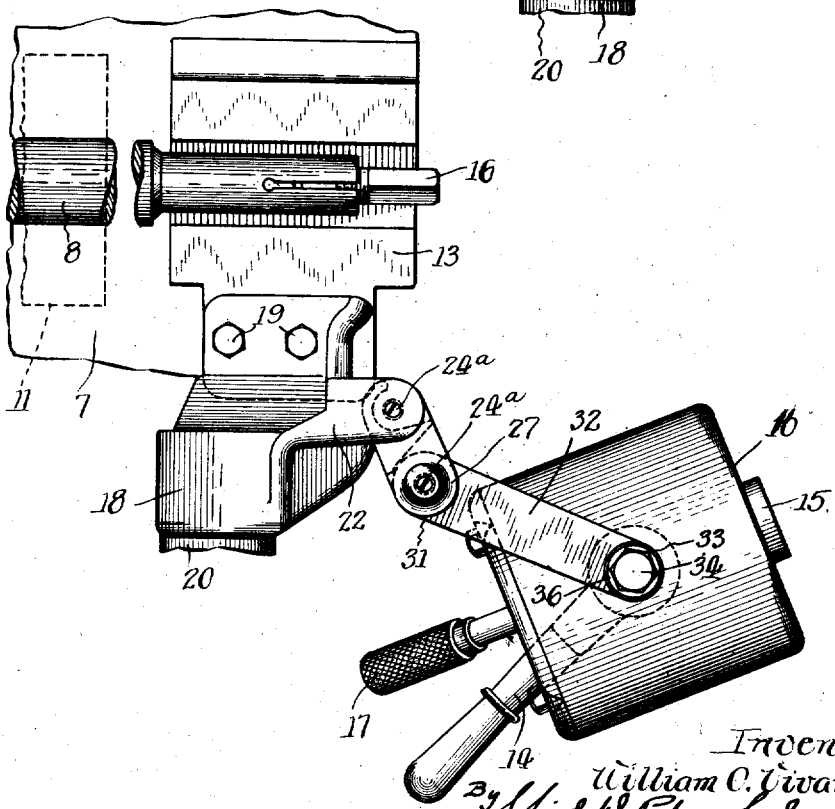
Fig. 2 is a similar view showing the movable bearing supported in inoperative position.

It will be apparent from an examination of Figs. 1 and 2 of the drawings that the arrangement of the supporting links 26 and 32 with respect to the bracket 18 on the one hand and the bearing 10 on the other is such that they permit the bearing to be moved first axially out of engagement with the frame and the spindle and thence swung laterally to a position at one side of the spindle in which the cutter head 11 may be readily removed from the spindle and replaced as desired.

By this relatively simple means, it will be observed, the operator may, with the expenditure of very little effort and with a minimum expenditure of time disengage the detachable bearing 10 from its spindle and swing it into an inoperative position. In restoring the bearing to its normal position, the fact that it is supported at the proper elevation materially facilitates its replacement upon the ways 13. In this connection, it is to be noted that the bearing is capable of a slight vertical adjustment by adjusting the screw-threaded pivot centers relative to the ways 13.

Furthermore, it will be apparent that by thus supporting the bearing, the danger that foreign matter might enter between the bearing and its ways unobserved by the operator is eliminated, thus ensuring that when the bearing is finally clamped in position upon the ways it will occupy a position in true alinement with the opposite bearing 9.

I claim as my invention:

1. In a moulder or the like the combination with a cutter spindle and a detachable bearing therefor, of means for supporting the bearing for movement axially of the spindle and then laterally to one side of the spindle, the arrangement being such that when the bearing is disengaged from the spindle by its axial movement relative thereto, it may be moved laterally with said supporting means so as to permit of removal of the cutter on the spindle.

2. In a moulder or the like, the combination with a horizontal cutter spindle and detachable bearing therefor, of means for swingably supporting the bearing for movement from a position in operative relation to the spindle to one side thereof and vice versa, said bearing being movable relative to the supporting means so that it may move axially into and out of operative relation to the spindle.

3. In a moulder or the like, the combination with a horizontal cutter spindle and detachable bearing therefor, of means for swingably supporting the bearing for movement from a position in operative relation to the spindle to one side thereof and vice versa, said means comprising an upright stationary bracket mounted at one side of the spindle and a pair of pivotally connected links mounted on said bracket and providing a swinging carrier for said bearing.

4. In a moulder or the like, the combination of a detachable spindle bearing, ways on which said bearing is normally supported, a stationary support at one side of the spindle, and means whereby said bearing is mounted on said support for movement axially of the spindle and also laterally toward and away from the axis of the spindle.

5. In a machine of the character set forth, the combination with a spindle and a detachable bearing therefor, of a carrier for the bearing, said bearing being movable relative to the carrier to permit the movement of the bearing axially of the spindle for disengagement therefrom, and the carrier being mounted for movement in a direction laterally away from the spindle whereby to support the bearing when thus disengaged from the spindle for movement into an out-of-the-way position.

6. In a machine of the character set forth, the combination with a spindle and a detachable bearing therefor, of a carrier for supporting the bearing on the machine frame while out of operative relation to the spindle comprising an upright bracket, a relatively short arm pivoted on said bracket so as to turn on a vertical axis, and a relatively long arm pivoted at one end to the free end of the short arm and pivotally secured at its other end to the upper side of the bearing.

7. In a moulder or the like, the combination of a detachable spindle bearing, ways on which said bearing is normally supported, a carrier for supporting the bearing on the machine frame for movement into and out of operative relation to the spindle, and means for adjusting the bearing in a vertical direction relative to said ways.

8. A moulder or the like having a main frame, a spindle having bearings on the frame one of which is detachable from the spindle, a slideway on the frame adapted to guide said detachable bearing for movement axially of the spindle, and means swingable on the frame for supporting said detachable bearing when disengaged from its slideway for movement into a position at one side of the spindle.

9. A machine of the character described having, in combination, a base frame, bearings thereon, a spindle rotatably mounted in said bearings and carrying a cutting tool which is removable endwise off the spindle, one of said bearings being slidably mounted on said base and removable from the spindle by movement in a direction axially off one end of said spindle, means for guiding said removable bearing out of and into supporting relation to said spindle, and a carrier for said removable bearing comprising two or more parts pivoted together, one of said parts being attached to said removable bearing and the other part being movably mounted on said base, said carrier operating in the withdrawal of said bearing from said spindle to permit the bearing to move first in a straight line axially off the spindle and then to swing laterally to a position at one side of the spindle whereby to permit removal and replacement of the cutting tool on said spindle.

10. A machine of the character described having, in combination, a base frame, a spindle, bearings for said spindle mounted on portions of said base frame which directly underlie said spindle, one of said bearings being removable from the spindle by movement in a direction axially off one end of said spindle, and a carrier for said removable bearing movably mounted on said base and permanently connected to said bearing, said carrier acting to support said bearing for movement from operative to inoperative position and vice versa, and the carrier embodying a pivotal joint which permits the bearing to be swung to said inoperative position at one side of the spindle after the bearing has been withdrawn in an axial direction from the spindle.

11. A machine of the character described having, in combination, a base frame, bearings thereon, a spindle rotatably mounted in said bearings, one of said bearings being removable from the spindle by movement in a direction axially off one end of said spindle, guideways on said base for guiding said removable bearing out of and into supporting relation to said spindle, a carrier pin on which said removable bearing is pivotally and permanently supported, and means mounted on the base for supporting said carrier pin for movement in a direction to permit the bearing to pass axially onto and off the spindle.

12. A machine of the character described having, in combination, a base frame, a pair of bearings thereon, a spindle rotatably mounted in said bearings and carrying a cutting tool which is removable endwise off the spindle, one of said bearings being movable relative to the base and the other bearing by movement in a direction axially of said spindle, guideways on said base for guiding said movable bearing axially of said spindle, and a carrier for said movable bearing permanently attached to said bearing and movably mounted on said base, and operating in the movement of said bearing to permit first the movement of the bearing axially of the spindle and then a pivotal movement of the bearing to a position whereby to permit withdrawal and replacement of said cutting tool.

13. A machine of the character described having in combination, a base frame, a pair of bearings thereon, a spindle rotatably mounted in said bearings and carrying a cutting tool which is removable endwise off the spindle, one of said bearings being slidably mounted on said base and removable from the spindle in a direction axially off one end of said spindle, guideways on said base for guiding said removable bearing axially of said spindle, and a carrier for said movable bearing comprising a pair of pivotally connected links, one of said links being pivotally attached to said bearing and the other of said links being pivotally supported on said base frame.

In testimony whereof I have hereunto affixed my signature.

WILLIAM O. VIVARTTAS.